United States Patent [19]

Engle

[11] Patent Number: 5,623,361
[45] Date of Patent: Apr. 22, 1997

[54] ENHANCED WAVEFRONT PHASE MODULATOR DEVICE

[76] Inventor: Craig D. Engle, 336 Cline Ave., Griffith, Ind. 46319

[21] Appl. No.: 390,690

[22] Filed: Feb. 17, 1995

Related U.S. Application Data

[63] Continuation-in-part of Ser. No. 370,021, Jan. 9, 1995.

[51] Int. Cl.$^6$ .................................................. G02B 26/00
[52] U.S. Cl. ......................... 359/291; 359/290; 359/292
[58] Field of Search ................................... 359/290, 291, 359/292, 293

[56] References Cited

U.S. PATENT DOCUMENTS

| | | | |
|---|---|---|---|
| 3,626,084 | 12/1971 | Wohl et al. | 178/7.5 D |
| 3,637,931 | 1/1972 | Donjon et al. | 178/7.5 BD |
| 3,835,346 | 9/1974 | Mast et al. | 313/394 |
| 4,879,602 | 11/1989 | Glenn | 358/233 |
| 5,172,262 | 12/1992 | Hornbeck | 359/223 |

OTHER PUBLICATIONS

Craig D. Engle, patent application serial number 08/370, 021, titled "Enhanced Phase Modulator", filed Jan. 9, 1995.
Craig D. Engle, patent application serial number 08/180, 029, filed Jan. 11, 1994 titled "Electronically Addressed Deformable Media Light Modulator".
Craig D. Engle, patent application serial number 08/020, 692, filed Feb. 22, 1993 titled "Poppet Valve Modulator".
N. K. Sheridon, "The Ruticon Family of Erasable Imaging Recording Devices" IEEE Transactions on Electron Devices, Sep. 1972.
R. Tepe et al, "Viscoleastic Control Layers for Solid State Light Valves" SPIE vol. 684, Liquid Crystal and Spatial Light Modulator Materials (1986).
B. Kazan and M. Knoll, "Electronic Image Storage", Academic Press, Inc copyright 1968, pp. 1–19.
B. Kazan and M. Knoll, "Storage Tubes and Their Basic Principles" John Wiley & Sons, pp. 1–13.
D. J. Gibbons, "The Barrier Grid Storage Tube" Electronic Engineering Oct. 1961.
Eugene T. Kozol et al, "Dielectric Membrane Light Valve Study", RADC–TR–71, Mar. 1971, Section 3 titled Theoretical Studies of the Elastomer Deformation.
Craig D. Engle, Enhanced Electron Beam Address Storage Target, serial number 08/183,037, filed Jan. 18, 1994.
J. R. Hansen and R. J. Schneeberger, "Liquid Crystal Media for Electron Beam Recording", IEEE Transactions on Electron Devices, vol. ED–15, No. 11, Nov. 1968.
Kurt Schlesinger et al, "A Mixed–Field Type of Vidicon" IEEE Transactions on Electronic Devices, vol. ED–14, No. 6, Mar. 1967.
Kurt Schlesinger, "Internal Electrostatic Deflection Yokes" Electronics Jul. 1952.

*Primary Examiner*—Georgia Y. Epps
*Assistant Examiner*—Ricky Mack

[57] ABSTRACT

A wavefront phase modulator device utilizes a dielectric reflector affixed to a substrate. Overlapping the dielectric reflector is a transmissive deformable media layer possessing rubbery attributes. Affixed to the surface of the layer which is opposite to the substrate is a transmissive deformable conductor. Affixing reflectors to the substrate avoids compromises associated with deformable reflectors affixed to deformable media, thereby enhancing reflectivity. Furthermore, affixing a deformable transmissive conductor to the surface of the transmissive deformable layer which opposes the substrate eliminates extraneous components, such as a second substrate, and/or gaps.

An electron beam addressing technique is described that enables electric fields to be established in the media layer to establish electrostatic forces on the conductor which leads to deformations in the conductor and the deformable layer thereby phase modulating a wavefront which is incident on the conductor and traverses the layer in accordance with an information bearing signal.

20 Claims, 3 Drawing Sheets

5,623,361

ENHANCED WAVEFRONT PHASE MODULATOR DEVICE

RELATED APPLICATION

This application is a continuation in part of earlier copending application U.S. Ser. No. 08/370,021, filed Jan. 9, 1995 of Craig D. Engle for Enhanced Phase Modulator.

BACKGROUND

1. Field of Invention

This invention relates to surface deformation type wavefront phase modulators and how to enhance performance of surface deformation type wavefront phase modulators.

2. Prior Art Discussion

As identified in related application Ser. No. 08/370,021, titled "Enhanced Phase Modulator", filed Jan. 9, 1995, and application Ser. No. 08/180,029, filed Jan. 11, 1994, titled "Electronically Addressed Deformable Media Light Modulator" and application Ser. No. 08,020,692, filed Feb. 22, 1993 titled "Popper Valve Modulator" all admitted to Craig D. Engle, prior art surface deformation type phase modulators suffer from a variety of problems. As identified in U.S. Pat. No. 4,879,602 to Glenn, Nov. 7, 1989, surface deformation type phase modulators which utilize deformable reflectors affixed to deformable media suffer from several performance compromises. Performance compromises identified by Glenn include trade offs between reflector reflectance, reflector thickness, and deformation efficiency. In addition, using a first surface deformable reflector precludes a wavefront from traversing a transmissive deformable media. Precluding a wavefront from traversing a deformable media precludes the possibility of a wavefront from being reflected from within the deformable media. Such a configuration is therefore precluded from the benefits to be identified herein.

Additional examples of surface deformation type wavefront phase modulators include U.S. Pat. No. 3,626,084 to Whol, Dec. 7, 1971. U.S. Pat. No. 3,626,084 suffers from extgraneous components and/or gaps between a transmissive conductor rigidly affixed to a second substrate and the deformable media. As to be shown herein, elements of the prior art can be eliminated without loss of capability.

OBJECTS AND ADVANTAGES

Accordingly, several objects and advantages of my invention are:

1) To identify addressing techniques which are compatible with the reflex surface deformation type wavefront phase modulator target of my invention.
2) To identify substrate materials and substrate material characteristics which are utilizable with my invention.
3) To identify alternative reflex surface deformation type wavefront phase modulator structures.
4) To identify electron beam addressing mechanisms which are compatible with my invention.

Further objects and advantages of my invention will become apparent from a consideration of the drawings and ensuing description of it.

LIST OF FIGURES

DESCRIPTION OF INVENTION

Figure 1:
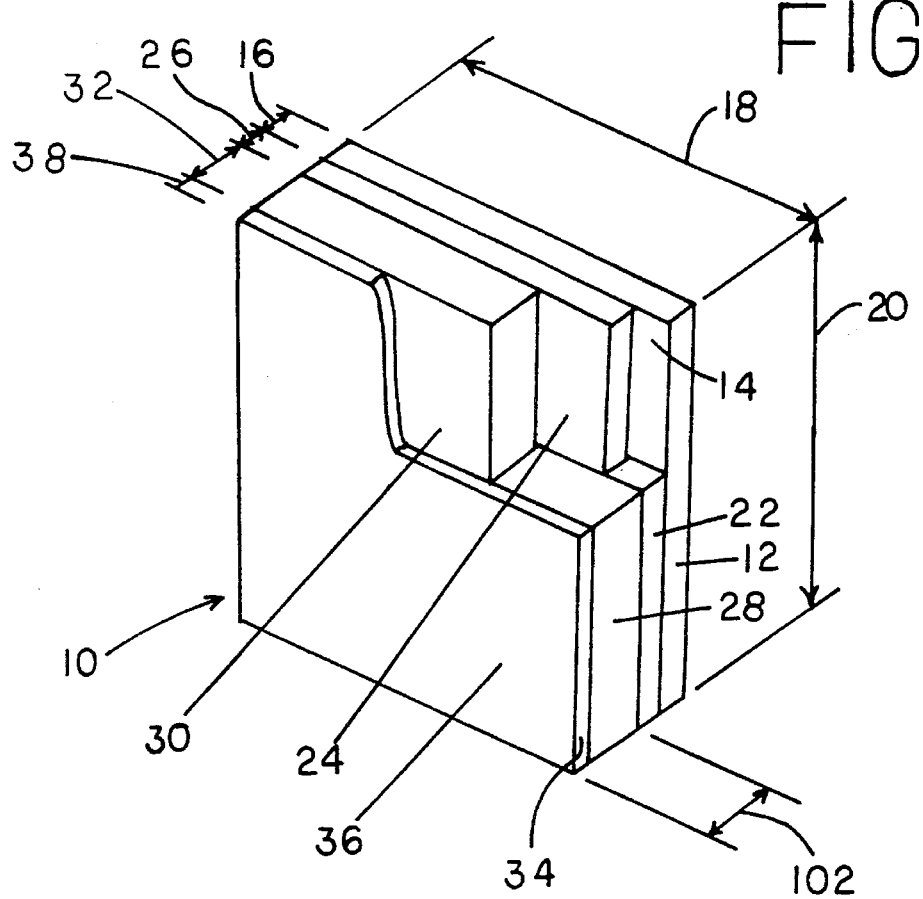
FIG. 1 shows a reflective surface deformation type phase modulator device.

FIG. 1 shows a reflex surface deformation type phase modulator target 10. Certain portions of the figure have been shown cutaway for clarity. Target 10 further includes a substrate 12. Substrate 12 includes a first substrate surface 14 and a second substrate surface. The second substrate surface is not visible in the figure. Surface 14 and the second substrate surface are essentially parallel planes separated by a substrate thickness 16. Thickness 16 is perpendicular to surface 14.

Substrate 12 further includes a first lateral dimension 18 and a second lateral dimension 20. Dimension 20 is perpendicular to dimension 18 and thickness 16. Dimension 18 is perpendicular to thickness 16.

Affixed to surface 14 is a dielectric reflector 22. Reflector 22 further includes a first reflector surface 24 and a second reflector surface. The second reflector surface is not visible in the figure. Surface 24 and the second reflector surface are essentially parallel planes separated by a reflector thickness 26. Thickness 26 is perpendicular to surface 24.

Affixing a dielectric reflector to the first surface of the substrate is a means to affix a reflective means to the substrate. As to be identified herein, alternative means exist to affix a reflective means to a substrate.

Although reflector 22 is shown as a single layer, as well understood by those knowledgeable in the state of the art, multilayer dielectric reflectors are utilizable in my invention. Information concerning dielectric reflectors which are suitable for use in my invention and techniques to affix a dielectric reflector to a substrate are provided in the references cited herein. See for instance information in U.S. Pat. No. 3,626,084 to Wohl, Dec. 7, 1971.

Affixed to surface 24 is a transmissive deformable media layer 28. Layer 28 further includes a first layer surface 30 and a second layer surface. The second layer surface is not visible in the figure. When target 10 is in an unenergized state, surface 30 and the second layer surface are essentially parallel planes separated by a layer thickness 32. In an unenergized state, thickness 32 is perpendicular to surface 30. Since layer 28 is affixed to reflector 22 and reflector 22 is affixed to substrate 12, layer 28 is affixed to substrate 12 by a means. In an unenergized state, layer 28 has an index of refraction N. As to be identified herein, alternative means exist to affix a transmissive deformable media layer to the substrate. Affixing layer 28 to surface 24 requires the second layer surface to adhere to surface 24. Techniques for affixing a media layer to a dielectric reflector are identified in the references cited herein.

Affixed to surface 30 is a transmissive deformable monolithic conductor 34. Conductor 34 further includes a first conductor surface 36 and a second conductor surface. The second conductor surface is not visible in the figure. In an unenergized state, surface 36 and the second conductor surface are essentially parallel planes separated by conductor thickness 38. In an unenergized state, thickness 38 is perpendicular to surface 36. In an unenergized state, surface 36 is offset from surface 24 by an equilibrium height 102. Height 102 is parallel to thickness 16.

Materials suitable for use as the transmissive deformable media layer in my invention include transmissive elastomers similar to what is described in the article titled "the Ruticon Family of Erasable Imaging Recording Devices" by N. K. Sheridon, IEEE Transactions on Electron Devices, September 1972, transmissive viscoelastic substances with properties similar to what is described in the article "Viscoelastic Control Layers for Solid-State Light Valves" by R. Tepe, et al., SPIE Vol. 684 Liquid Crystal and Spatial Light Modulator Materials (1986), and transmissive gels similar to what is described in U.S. Pat. No. 3,835,346 to Mast et al Sep. 10, 1974, etc. Additional transmissive deformable media layer materials which are utilizable in my invention include silicone rubbers, and polymers, similar to what is described in the references cited herein.

Several material properties characterize the behavior of layer 28 in my invention. Parameters which characterize the media layer of my invention include the layer's dielectric constant, Poission's ratio, and Young's Modulus. Representative values and assumptions that are associated with identification of material properties are identified in the references provided herein. As well understood by those knowledgeable in the state of the art, viscoelastic substances exhibit properties of an ideal elastic solid as well as those of a viscous liquid. Accordingly, viscoelastic substances exhibit rubbery attributes. As identified in the references provided herein, dynamic viscosity and "capillarity constant" and shear modulus are important characteristic for certain substances which are utilizable in my invention. Additional descriptions which characterize the layer of my invention include isotropic and incompressible.

Materials which are utilizable as a transmissive deformable conductor include indium tin oxide.

The target of my invention is electron beam addressable. As to be shown herein, electron beam addressing is a means to establish an electric field in the deformable media layer, to establish electrostatic forces on the deformable conductor of the target to control the deformations of the media layer and the deformable conductor to phase modulate a wavefront which traverses the deformable media layer of the target in accordance with an information bearing signal.

Figure 2:
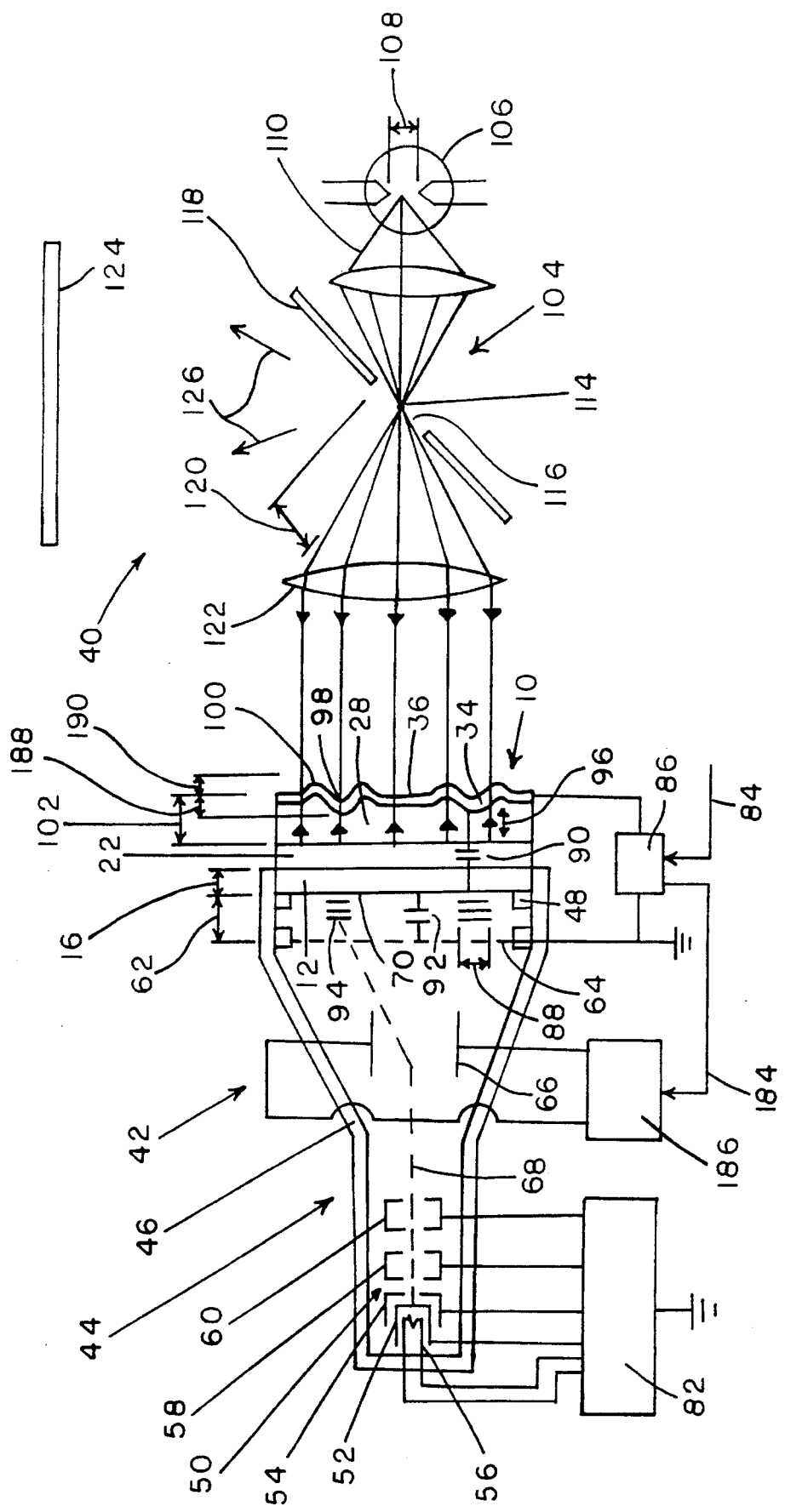
FIG. 2 shows a projection display system which utilizes schlieren optics in conjunction with a reflective electron beam addressed surface deformation type phase modulator.

FIG. 2 shows a HDTV projection display system 40. System 40 further includes an electron beam addressed phase modulator 42. Modulator 42 further includes target 10 and a serial electron beam addressing mechanism 44. Mechanism 44 further includes a vacuum envelope 46. Envelope 46 is fabricated from any suitable material, such as glass, and is of any suitable shape. Material and shape considerations of vacuum envelopes for use in electron beam addressed phase modulators are well understood by those knowledgeable in the state of the art.

Target 10 is sealed to envelope 46 by target ring 48. Techniques for vacuum sealing a target to an envelope are well understood by those knowledgeable in the state of the art and are not shown in great detail. Techniques for sealing a target to an envelope are identified in the references provided herein.

Mechanism 44 further includes an electron gun 50. Gun 50 further includes a cathode 52, a control grid 54, a heater 56, an accelerating grid 58 and a focusing mechanism 60. Electron guns are well understood by those knowledgeable in the state of the art and consequently, gun 50 is not shown in detail.

Separated from target 10 by a grid separation distance 62 is a barrier grid 64. Separation distance 62 is parallel to substrate thickness 16. As well understood by those knowledgeable in the state of the art, grid 64 functions as an electron collector. Barrier grid geometries which are utilizable in my invention are well understood by those knowledgeable in the state of the art and therefore grid 64 is not shown in detail. See for instance information in U.S. Pat. No. 3,637,931 to Donjon et al, Jan. 25, 1972 and the references cited herein.

Mechanism 44 further includes an electron beam deflection means 66. Electron deflection means 66 enables an electron beam 68 generated by gun 50 to be positioned to any location on a second surface 70 of substrate 12 of target 10. Electron beam deflection means are well understood by those knowledgeable in the state of the art and are not shown in detail.

Electron beam deflection means include electrostatic and electromagnetic deflection techniques. Selection of a particular electron beam deflection technique influences the requirements associated with focusing mechanism 60. For instance, if electrostatic deflection is implemented using the "deflectron", then focusing mechanism 60 is preferably a solenoid. See for instance, information in the article titled "A Mixed-field Type of Vidicon" by Kurt Schlesinger and Richard A. Wagner, IEEE Transactions on Electron Devices, Vol. ED-14, No. 3, March 1967, and the article titled "Internal Electrostatic Deflection Yokes" by Kurt Schlesinger, Electronics, July, 1952.

Deflection patterns, scan velocities, etc. associated with positioning an electron beam on the second substrate surface of the target for use in a HDTV projection display system are well understood by those knowledgeable in the state of the art.

Figure 3:
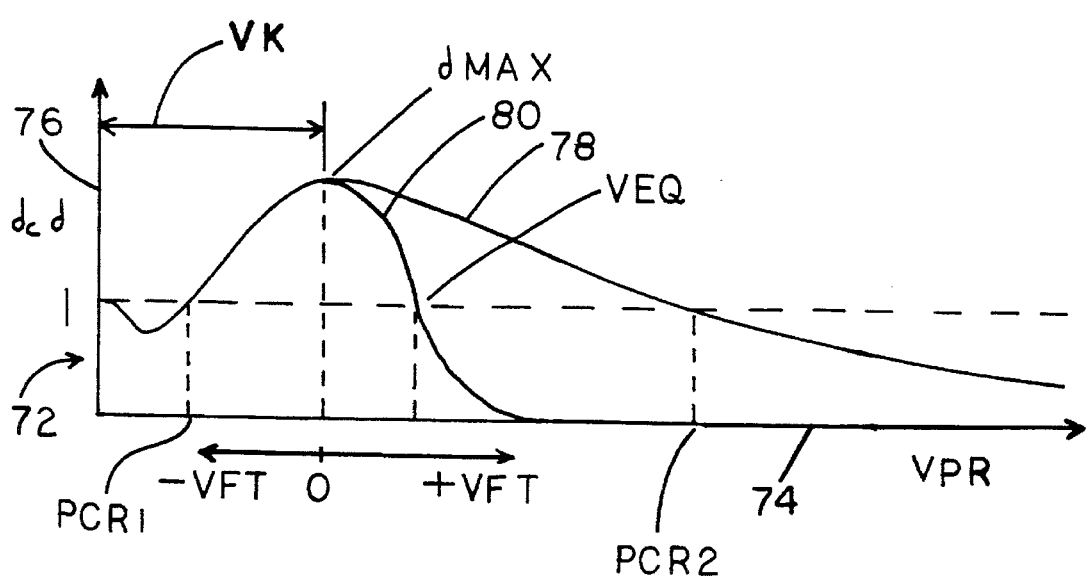
FIG. 3 shows a secondary electron emission ratio curve.

As well understood by those knowledgeable in the state of the art, several different types of electron beam addressing techniques exist to deposit charge on the second surface of the substrate utilized in the target of my invention. FIG. 3 shows a graph 72 to assist in identifying operating characteristics associated with electron beam addressed wavefront phase modulating targets. Graph 72 contains a horizontal axis 74 and a vertical axis 76. Graph 72 contains a secondary electron emission ratio curve 78 which is characteristic of the substrate utilized in my invention. Curve 78 identifies the secondary electron emission ratio & as a function of the acceleration voltage Vpr associated with the electrons of the electron beam bombarding the substrate of my invention. The substrate, electron beam, means for applying an accelerating voltage to an electron beam, etc., are not shown in FIG. 3.

When interpreting curve 78, the horizontal axis 74 is labeled with acceleration voltage Vpr, the acceleration voltage associated with the primary electrons. When interpolating curve 78, the vertical axis 76 is labeled with the secondary emission ratio &, which is defined as the ratio of secondary electrons emitted from the substrate to the number of primary electron striking the substrate. Relationships between acceleration voltage and the primary energy of the incident electrons of an electron beam are well understood by those knowledgeable in the state of the art.

Techniques for measuring the secondary electron emission ratio curve 78 of a substrate material, as a function of the accelerating voltage associated with the primary electrons bombarding the substrate, are well understood by those knowledgeable in the state of the art. See for instance information contained in the book titled "Electronic Image Storage" by B. Kazan and M. Knoll, Academic Press, Inc, copyright 1968, pages 1 to 29 and the book titled "Storage Tubes and Their Basic Principles" by M. Knoll and B. Kazan, John Wiley & Sons, Inc, pages 1 to 13. Interpretation of the information cited in the references, as described relative to the parameters associated with my invention, is well understood by those knowledgeable in the state of the art.

Curve 74 contains a first crossover point Pcr1 and a second crossover point Pcr2. As well understood by those knowledgeable in the state of the art, crossover points are located at the values of the acceleration voltage where the secondary electron emission ratio & is unity. Curvey 74 further includes a secondary emissions ratio maximum &max.

Graph 74 further includes a collected current ratio branch 80. As well understood by those knowledgeable in the state of the art, branch 80 is related to the influence an electron collector, such as a barrier grid, and the potential difference between the electron collector and the bombarded surface of the target have on the current collected by the collector from the target which is bombarded by the primary electron beam. The electron collector, target, and electron beam are not shown in FIG. 3.

When interpreting branch 80 of graph 72, the horizontal axis 74 is supplemented with the potential difference Vft between the collector and the surface of the target which is bombarded by the primary electron beam. The vertical axis 76 is labeled with the collected secondary current ratio &c of the electron collector. The collected secondary current ratio &c is defined as the current collected by the collector divided by the primary current bombarding the target.

A cathode to collector potential difference Vk is shown on FIG. 3. The cathode is not shown in the figure. A collector (grid) to the bombarded target surface potential difference Vft is shown on FIG. 3. An equilibrium potential Veq is shown on FIG. 3. The equilibrium potential Veq corresponds to the value of potential difference Vft where the value of &c equals unity.

Returning to FIG. 2, the preferred mode of operation of mechanism 44 is an equilibrium electron beam writing means. Such techniques are well understood by those knowledgeable in the state of the art. The potentials applied to the electron gun 50 by a voltage source 82 are selected so that electrons associated with electron beam 68 are accelerated by an acceleration voltage which lies between the first crossover point and the second crossover point associated with the secondary electron emission ratio curve identified in FIG. 2.

Voltages required from source 82 to satisfy the requirements of equilibrium writing by mechanism 44, including the influence of selecting a particular substrate material, are well understood by those knowledgeable in the state of the art.

The secondary electron emission ratio maximum &max of surface 70 of substrate 12 is required to be greater than unity. Substrate materials which are utilizable in my invention include mica. Characteristics required from a mica substrate, for use in my invention, are identified in the references provided herein. Alternative substrate materials include glass and other insulators.

Electron gun 50 is operated so the electron beam current of electron beam 68 is essentially constant. Electron beam currents suitable for use with my invention typically range from 5 microamps to 50 microamps. Voltages required from source 82, so that gun 50 operates with the desired electron beam characteristics, are well understood by those knowledgeable in the state of the art.

An information bearing signal 84 is applied to an amplifier drive means 86. Means 86 applies a potential difference between grid 64 and conductor 34 of target 10 as a function of signal 84 in synchronism with the deflection of electron beam 68 by deflection means 66. A synchronization signal 184 is provided between means 86 and a deflection drive means 186 to synchronizes application of the potential difference between grid 64 and conductor 34 with the position of beam 68 on surface 70. Relationships between the information bearing signal and the potential difference applied between the grid and the conductor, and electronic interfaces between the amplifier drive means and the deflection means are well understood by those knowledgeable in the state of the art and are not shown in detail the figure. Deflection scan patterns for positioning beam 68 on surface 70 are well understood by those knowledgeable in the state of the art.

The preferred method of equilibrium writing utilized in my invention requires the potential applied to grid 64 to be constant while the instantaneous input voltage variations related to information bearing signal 84 are applied to conductor 34. The charge deposition characteristics associated with this mode of operation are identified in the references cited herein. Electron beam 68 further includes a spot size 88. Factors which effect electron beams spot sizes are well understood by those knowledgeable in the state of the art. As identified in the reference titled "The Barrier Grid Storage tube" by D. J. Gibbons, Electronic Engineering, October 1961, a convenient way of visualizing an elemental target area is to assume that it is the area of the target beneath the beam spot. Accordingly, due to electron deflection means 66 deflecting beam 68, each elemental area of target 10 will have a elemental target capacitance 90 with respect to conductor 34 of target 10. Capacitance values are illustrated in a schematic fashion to facilitate discussion purposes. For convenience, only spot size 88 is shown, and not the corresponding elemental target area beneath the electron beam spot.

As well understood by those knowledgeable in the state of the art, parameters associated with mechanism 44 will establish an effective electron beam conductance. In addition, each elemental target area will have a capacitance 92 with respect to grid 64.

The elemental area of the target which coincides with the instantaneous location of spot size 88 will tend to stabilize to the equilibrium potential identified in FIG. 3 by the secondary emission charging action of electron beam 68 against the action of the instantaneous potential applied to conductor 34 by means 86. As a result, each elemental target capacitor 90, bombarded by electron beam 68, will acquire a net charge 94, shown as a sequence of vertical lines, such that after bombardment the elemental target area will have a potential (with respect to equilibrium potential) proportional and opposite in sign to the instantaneous potential applied to the conductor 34 during scanning.

Quoting from the reference titled "The barrier Grid Storage Tube", by D. J. Gibbons, Electronics, October 1961 which concerns equilibrium writing, "This process entails the deposition of charges from the beam at each point of the storage surface proportional to the instantaneous value of the writing voltage. When the writing operation is complete the surface of the target retains a complete analogue charge pattern of both positive and negative charges."

As identified in the reference titled "Dielectric Membrane Light Valve Study" by Eugene T. Kozol et al, Technical Report RADC-TR-71, March 1971, Section 3 titled "Theoretical Studies of the Elastomer Deformation", charge 94 deposited on surface 70 establishes an electric field thickness component 96 in layer 28. Thickness 16, the first lateral dimension and the second lateral dimension of substrate 12 establish a basis for describing electric field components in layer 28 as a function of charge 94 distributed on surface 70 of substrate 12 of target 10. The first lateral dimension and the second lateral dimension of substrate 12 are not shown in the figure. Only electric field thickness component 96 is shown in FIG. 2 for convenience. As described in the references cited herein, additional electric field components will exist. Component 96 is parallel to thickness 16.

As further identified in references cited herein, an electric field in the deformable layer generates electrostatic forces which act on conductor 34 leading to compressional forces which act on layer 28. Electrostatic forces and compressional forces are not shown in the figure. Information concerning the nature of such forces are provided in the reference cited herein.

Due to the material properties associated with layer 28, depressions 98 and accompanying sidelobes 100 are established in response to electrostatic forces acting on conductor 34. Associated with depressions 98 is a thickness decrement 188. Decrements 188 are a type of deformation which decreases the separation between surface 36 and reflector 22 from the unenergized equilibrium height 102 during operation of target 10. Associated with sidelobes 100 is a thickness increment 190. Increments 190 are a type of deformation which increases the separation between surface 36 and reflector 22 from the unenergized equilibrium height 102 during operation of target 10.

Positional dependencies associated with decrements and increments are describable as a function which depends on the first lateral dimension and the second lateral dimension of the substrate.

System 40 further includes schlieren optics 104. Schlieren optics are well understood by those knowledgeable in the state of the art and therefore shown in a simplified manner. Optics 104 further includes a small area light source 106 having a lateral dimension 108. Source 106 is depicted as being an arc lamp. Such sources are well understood by those knowledgeable in the state of the art. The relationship between an acceptable definition of "small area" and the performance associated with schlieren optics are well understood by those knowledgeable in the state of the art.

A plurality of light rays 110 diverge from source 106. A condenser lens 112 collects rays 110 from source 106 and forms a source image 114 of source 106. Source image 114 is located within an aperture 116 of a fold mirror 118. Aperture 116 further includes an aperture diameter 120. Light rays 110 diverge from image 114 and are collected by a schlieren lens 122. Schlieren lesns 122 collimates rays 110 rendering them essentially parallel to target thickness 16.

Relationships between a wavefront and light rays are well understood by those knowledgeable in the state of the art. For convenience, only light rays are shown in the figure. A wavefront, as indicated by light rays 110, is incident upon conductor 34 traverses layer 28 and is incident on reflector 22. Reflector 22 reflect the wavefront and the wavefront traverses layer 28 a second time and exists target 10.

No attempt is made in FIG. 2 to indicate the influence of deformations associated with layer 28 and conductor 34 on light rays 110. Direction of propagation associated with the light rays could be identified by direction cosines relative to the target dimensions. As well understood by those knowledgeable in the state of the art, optical path length variations will be impressed on the wavefront which traverses target 10. The optical path length variations will exhibit a functional dependence on depressions 98 and side lobes 100. The index of refraction N of layer 128, the magnitude of thickness decrements 188 associated with depressions 98 and the magnitude of thickness increments 190 associated with sidelobes 100, and the wavelength of the wavefront all influence the optical path length variations imparted to the wavefront which traverses target 10.

Schlieren lens 122 forms a target image of target 10 on a projection screen 124. For convenience, no target image is shown, only screen 124 is shown. Screen 124 is a reflective lambertian screen. Diffracted light 126, which is related to the optical path length variations imparted to the wavefront which traverses target 10 is reflected by mirror 118 toward screen 124. As well understood by those knowledgeable in the state of the art, the brightness of the target image viewable on screen 124 is related to the optical path length variations associated with the phase modulated wavefront traversing target 10. Optical aspects such as object and image distances from lens 122, and the focal length of lens 122 are not explicitly shown. Such considerations, as well as the resulting magnification of the target image are well understood by those knowledgeable in the state of the art. The drawing scale associated with FIG. 2 has been greatly exaggerated and distorted to emphasize certain aspects of my invention.

Target 10 provides several advantages over prior art. The reflective means associated with the target is affixed to the substrate, thereby avoiding the performance compromises that have plagued prior art devices which utilized deformable reflectors affixed to a deformable media. This enhances the reflectivity of my invention over prior art, thereby enhancing efficiency of my invention over prior art.

In addition, applicant believes that utilizing a transmissive deformable conductor and a transmissive deformable media layer with a reflective means affixed to the substrate, to allow a wavefront to be reflected from within the deformable media layer, will further enhance diffraction efficiency of applicant's invention over prior art.

The basis for this belief is the information provided in the article titled "The Ruticon Family of Imaging Recording Devices". As identified, the Alpha Ruticon has the highest diffraction efficiency since a wavefront is reflected from with the elastomer layer which has a index of refraction of about 1.5. Applicant's invention emulates this desirable feature of the Alpha Ruticon by affixing the reflective means to the substrate and utilizing a transmissive deformable conductor affixed to the surface of a transmissive deformable layer which opposes the substrate.

Applicant's invention provides additional benefits such as eliminating extraneous substrates and/or gaps that have plagued prior art devices. As cited in the references provided herein, voltage division appear across a gap, and gap parallelism must be held to a very high tolerance. Gaps require extraneous components, such as a second substrate.

Figure 4:
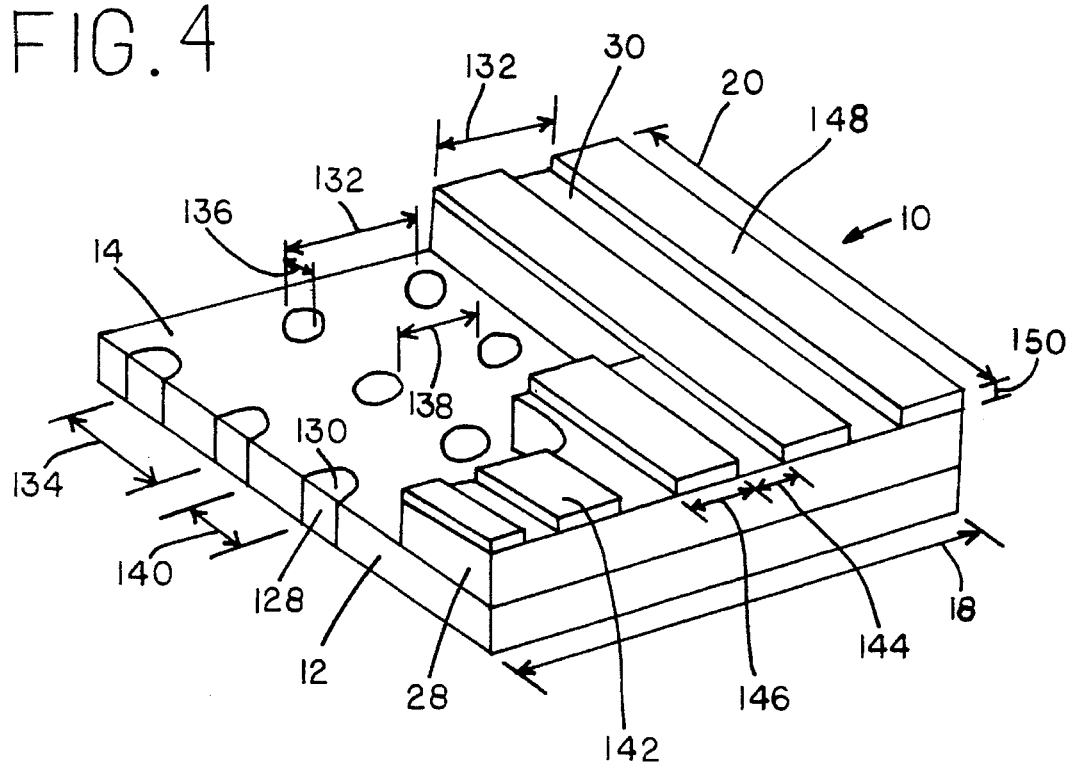
FIG. 4 shows a surface deformation type phase modulator target which is compatible with row addressed electron beam source arrays.

FIG. 4 shows an alternative target 10. Certain portions of the figure have been shown cut away for clarity. Target 10 further includes a substrate 12. Substrate 12 further includes a first surface 14 and a second surface. The second surface of substrate 12 is not visible in the figure. Embedded in substrate 12 is a plurality of conductive feedthroughs 128. Each feedthrough 128 further includes a first feedthrough surface 130 and a second feedthrough surface. The second feedthrough surfaces are not visible in the figure. Embedding feedthroughs 128 in substrate 12 further includes surface 130 of each feedthrough 128 being coplanar with surface 14 and the second surface of each feedthrough 128 being coplanar with the second surface of substrate 12. Means for embedding feedthroughs in a substrate are well understood by those knowledgeable in the state of the art.

Feedthroughs 128 are arranged into a matrix of p rows and q columns. Adjacent feedthroughs 128 in each row p are displaced by a first period 132. Period 132 is parallel to dimension 18. Adjacent feedthroughs 128 in each column q are displaced by a second period 134. Period 134 is parallel to dimension 20. Each surface 130 further includes a surface diameter 136. Diameter 136 is selected so a first insulating dimension 138 exists between adjacent feedthroughs 128 in each row p and a second simulating dimension 140 exists between adjacent feedthroughs 128 in each column q. Dimension 140 is parallel to dimension 20 and dimension 138 is parallel to dimension 18.

Surface 130 of each feedthrough 128 is processed to be reflective. Embedding feedthroughs 128 in substrate 12 and processing each surface 130 to be reflective is a means for affixing a reflective means to a substrate. Affixed to surface 130 of each feedthrough 128 and surface 14 is a transmissive deformable media layer 28. Affixed to surface 30 of layer 28 is a plurality of transmissive deformable column conductors 142. Each conductor 142 overlaps a respective column q of feedthroughs 128. Certain portions of the figure have been shown cut away for clarity. Adjacent conductors 142 are displaced by period 132. Adjacent conductors 142 are separated by a conductor gap 144. Each conductor 142 further includes a conductor width 146. Width 146 is parallel to period 132.

Each conductor 142 further includes a first conductor surface 148 and a second conductor surface. The second conductor surfaces are not visible in the figure. In an unenergized state, surface 148 and the second surface of each conductor 142 are essentially parallel planes separated by a conductor thickness 150. In an unenergized state, thickness 150 is perpendicular to surface 148.

Target 10 shown in FIG. 4 is electron beam addressable. Electron beam addressing techniques include serial and row at a time electron beam addressing techniques. References for row at a time electron beam addressing techniques include the patent application admitted to Craig D. Engle titled "enhanced Electron Beam Addressed Storage Target", Ser. No. 08/183,037, filed Jan. 18, 1994. The column conductors 142 could be held at a common potential for use with serial electron beam addressing techniques. Phase modulation characteristics associated with a wavefront which traverses target 10 as described in FIG. 4 are similar to what has been previously described with the target in FIG. 2.

Holding each column conductor at a common potential allows features of a monolithic conductor to be simultaneously combined with properties of column conductors. Such flexibility is an advantage inherent in applicant's invention. Techniques for applying potentials to the column conductors 142 are not shown in the figure.

The second surface of each feedthrough must exhibit a secondary emissions ratio greater than unity for equilibrium writing techniques to be utilized. Feedthrough materials which meet this requirement are well understood by those knowledgeable in the state of the art. Furthermore, a high yield secondary electron emissions layer, such as MgO could be affixed to the second surface of the substrate to assist in optimizing the target. Such techniques are described in the references cited herein.

Figure 5:
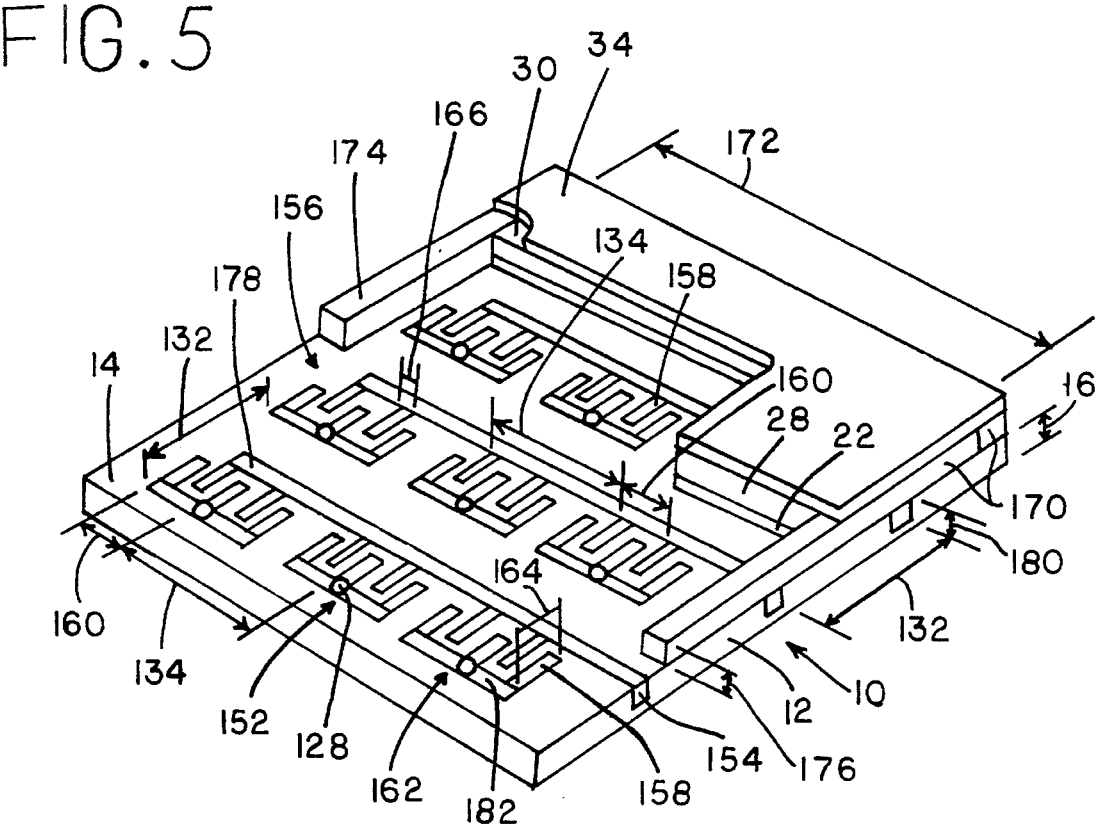
FIG. 5 shows a surface deformation type wavefront phase modulator target which utilizes interdigital electrodes.

FIG. 5 shows an alternative target 10. Affixed to target 10 is a plurality of interdigital electrodes 152. Target 10 further includes a substrate 12. Embedded in substrate 12 is a plurality of feedthroughs 128 arranged into a matrix of p rows and q columns. Adjacent feedthroughs 128 in each row p are displaced by period 132. Adjacent feedthroughs 128 in each column q are displaced by period 134.

Affixed to substrate 12 is a plurality of column busses 154. Adjacent busses 154 are displaced by period 132. Affixed to each buss 154 is a plurality of electrode structures 156. Adjacent structures 156 affixed to each buss 154 are displaced by period 134. Each structure 156 further includes a plurality of conductive fingers 158. Adjacent fingers 158 in each structure 156 are displaced by a finger period 160. Period 160 is parallel to period 134.

Electrically connected to each feedthrough 128 is a respective finger group 162. Each finger group 162 further includes a plurality of fingers 158. Adjacent fingers 158 in each finger group 162 are displaced by period 160. Fingers 158 which belong to a group 162 and are separated from the feedthrough 128 of the group 162 are electrically connected to the feedthrough 128 of the group 162 by an electrical interconnect 182.

Every finger 158 in each electrode 152 further includes a finger length 164. Length 164 is parallel to period 132. Each finger 158 further includes a finger width 166. Width 166 is parallel to period 160.

Fingers 158 from each finger group 162 in each column q are spatially phased relative to the fingers 158 of a respective structure 156 affixed to an adjacent buss 154 to interweave the fingers 158 in each group 162 with the fingers 158 of the respective structure 156 to generate a matrix of p rows and q columns of electrodes 152. Interdigital electrodes 152 effect the spatial nature of electric fields in my invention. Electric fields are not shown in this figure. In this manner, additional influence is available in my invention to control electric fields. The means for generating electric fields in my invention has been extended to include electrodes affixed to the substrate, to further enhance control of electric fields in the deformable layer.

The interdigital electrode structure of my invention provides several degrees of freedom. Each buss 154 is maintained at a common potential. The common potential source is not shown in the figure. Alternatively, each buss 154 could be electrically connected to a respective potential source. The respective potential sources are not shown in the figure.

Dielectric reflector 22 is affixed to surface 14 and overlaps every finger 158 in each electrode 152. Each interdigital electrode 152 is embedded in substrate 12 so that a first finger surface 168 of every finger 158 is coplanar with surface 14. Embedding electrodes in the substrate facilitate affixing the dielectric reflector to the substrate. Embedding techniques are well understood by those knowledgeable in the state of the art.

Affixed to surface 14 is a plurality of side ridges 170. Certain portions of the figure have been shown cutaway or removed for clarity. Opposing ridges 170 are separated by a target active dimension 172. Dimension 172 is perpendicular to thickness 16. Each ridge 170 further includes a ridge crown surface 174 and a second ridge surface. The second ridge surfaces are not visible in the figure. Surface 74 and the second ridge surface are essential parallel surface separated by a ridge height 176. Height 176 is parallel to thickness 16. The second ridge surface is affixed to surface 14. Etching of glass substrates is a means to affix ridges to the substrate.

Target 10 further includes reflector 22 affixed to substrate 12 and layer 28 affixed to reflector 22. Conductor 34 is affixed to surface 30 of layer 28. The second surface of conductor 34 is further affixed to surface 174. The second surface of conductor 34 is not visible in the figure. Operation of target 10, for phase modulating a wavefront incident on conductor 34, which traverses layer 28 and is incident on and reflected by reflector 22 to traverse layer 28 a second time then exists target 10 is similar to what has been previously described.

Each buss 154 further includes a first buss surface 178 and a second buss surface. The second buss surfaces are not visible in the figure. Surface 178 and the second buss surface are essentially parallel planes separated by a buss thickness 180. Thickness 180 is perpendicular to surface 178. Busses 154 are embedded in substrate 12. Embedding busses 154 in substrate 12 requires surface 178 being coplanar with surface 14.

Each finger 158 further includes a second finger surface and a finger thickness. The finger thickness and second finger surfaces are not visible in the figure. Finger thickness is similar to buss thickness. Similar thickness and second surface considerations exit for electrical interconnects 182 but are not shown in the figure for convenience.

CONCLUSIONS, RAMIFICATIONS, AND SCOPE OF THE INVENTION

Thus the reader will see that the surface deformation type wavefront phase modulator of applicant's invention eliminates reflectivity compromises that have plagued prior art device by affixing reflective means to the substrate. In addition, a wavefront is reflected from within the transmissive deformable media layer of applicant's invention thereby emulating that desirable feature of the Alpha ruticon. Applicant believes that this aspect of applicant's invention will enhance diffraction efficiency over prior art devices which utilized first surface reflectors.

While my above description contains many specificities, these should not be construed as limitations on the scope of the invention, but rather as an exemplification of one preferred embodiment thereof. Many other variations are possible. The arrangement of the target cold be reordered to allow the dielectric reflector to be bombarded by the electron beam. In this configuration, the order of component is the transmissive conductor, the transmissive deformable media layer, the substrate, and the dielectric reflector. Such an arrangement of components represents a means to affix a reflective means to the substrate and a means to affix the deformable layer to the substrate. This arrangement of components is generally not desired in applicant's invention since it imposes additional optical requirements on the substrate, such as strict parallelism of the substrate surfaces and requires the substrate to be optically transparent. The use of transparent substrate could limit the electric field means that could be utilized with my invention. As identified in copending applications, use of transmissive substrates impedes the utilization of electronic addressing components affixed to the substrate to function, along with electrode structures affixed to the substrate, as the electric field means in electronically addressed version of my invention.

Column conductors will establish different boundary conditions on the media layer when compared to monolithic conductors. Techniques to fully utilize the flexibility inherent in my invention include utilizing interdigital electrodes with column conductors. Due to differences in boundary conditions between a monolithic conductor and column conductors, differences will exist in the surface deformation response between a monolithic conductor and column conductors.

Orientation of column conductors relative to the conductive finger dimensions of the interdigital electrodes is another variable that is available in applicant's invention. Diffraction of a wavefront associated with a deformation of the target does not require the deformation to be symmetric. Accordingly, surface tensions are an additional degree of freedom available in my invention to influence the deformation response of a surface deformation type wavefront phase modulator. Such latitude is simultaneously available with other benefits of my invention indicating that synergism is present in applicant's invention.

Additional variations in the target of my invention are possible. As previously described, electric field means include utilizing electronic components affixed to the substrate. Furthermore, the substrate of my invention could be opaque, since the wavefront preferably does not traverse the substrate, thereby facilitating integration of alternative electric field means.

Further variations are possible. For instance, optical addressing is a means to establish an electric field in the media layer. A photosensitive element could be interfaced to the target of my invention in several ways to generate an optically addressed device. A photoconductor could be affixed to the second surface of a substrate which contains feedthroughs. The photoconductor would be in contact with the second face of each feedthrough. Utilizing an opaque substrate would then provide a means to isolate write light from read light.

Alternatively, the substrate of my invention could be fabricated from a photosensitive material. The substrate material could be a photoconductor. Photoconductor materials suitable for use as a substrate in optically addressed spatial light modulators are well understood by those knowledgeable in the state of the art. Additional optical addressing configurations which could be utilized with my invention, to function as the electric field means, include the substrate being fabricated to comprise a hetrojunction photodiode. Such techniques increase the functionality of the substrate in my invention.

A large bias potential difference could be applied across the target of my invention utilizing procedures identified in the article titled "Liquid Crystal Media for Electron Beam Recording" by J. R. Hansen and R. J. Schneeberger, IEEE Transactions on Electron Devices, Vol. ED-15, No. 11, November 1968. In addition, the potential difference applied between the barrier grid and the transmissive deformable conductor could be achieved by holding the conductor at a fixed potential and applying the varying component to the barrier grid. Such techniques are well understood by those knowledgeable in the state of the art.

Although the screen identified for use with the schlieren optics was reflective, transmissive screens are acceptable as well.

Accordingly, the scope of the invention should be determined not by the embodiments illustrated, but by the appended claims and their legal equivalents.

I claim:

1. A surface deformation type wavefront phase modulator component comprising:

a substrate, transmissive electrostatically deformable media means comprising a single layer of material, said single layer of material further includes a first surface facing said substrate and a second surface opposite thereof, transmissive deformable conductor means affixed to said second surface of said single layer of material, reflective means contiguous with said first surface of said single layer of said material, said media means is integrally associated with said substrate, said second surface of said single layer of material is opposite said reflective means.

2. The device of claim 1 further including an electric field control means to apply electrostatic forces to said conductor means, means operatively associated with said control means varying said electrostatic forces which varies separation of said conductor means and said first surface of said single layer of material from said substrate thereby phase modulating a wavefront incident on said conductor means and traversing said media means and impinging on and reflected by said reflective means to again traverse said media means and issue from said modulator, said reflective means is integrally associated with said substrate.

3. The device of claim 2 wherein said single layer of material is a transmissive electrostatically deformable gel.

4. The device of claim 2 wherein said single layer of material is selected from the group consisting of transmissive viscoelastic substances and transmissive elastomers.

5. The device of claim 4 further including schlieren means to transform said phase modulated wavefront to a wavefront having identifiable brightness characteristics viewable on a viewing screen.

6. The device of claim 5 wherein said electric field control means further includes an electron beam addressing mechanism, said substrate is an insulating substrate, said reflective means is stationary.

7. The device of claim 5 wherein said reflective means comprises a reflective element selected from the group consisting of dielectric reflectors and reflective electrodes.

8. The device of claim 7 wherein said reflective element comprises a dielectric reflector affixed to said substrate, said control means further includes a plurality of first electrodes affixed to said substrate, said dielectric reflector overlaps said first electrodes, said first surface of said media means is adjacent and affixed to said dielectric reflector.

9. The device of claim 8 wherein said control means further includes each said first electrode being electrically connected to a respective electronic switching element.

10. The device of claim 9 wherein said substrate is an insulating substrate, each said electronic switching element comprises a thin film transistor, said thin film transistors are affixed to a surface of said insulating substrate which is opposite said dielectric reflector and said media means.

11. An surface deformation type wavefront phase modulator comprising:

a substrate, reflective means integrally associated with said substrate, transmissive electrostatically deformable media means, said media means further includes a first surface facing said substrate and a second surface opposite thereof, transmissive deformable conductor means affixed to said second surface of said media means, said media means is integrally associated with said substrate, said second surface of said media means is opposite said reflective means, electric field control means to apply electrostatic forces to said conductor means, means operatively associated with said control means varying said electrostatic forces which varies deformation of said conductor means and said media means thereby phase modulating a wavefront incident on said conductor means and traversing said media means and impinging on and reflected by said reflective means to again traverse said media means and issue from said modulator, schlieren means to transform said phase modulated wavefront to a wavefront having identifiable brightness characteristics viewable on a viewing screen.

12. The device of claim 11 wherein said media means comprises a material selected from the group consisting of transmissive viscoelastic substances and transmissive elastomers.

13. The device of claim 12 wherein said reflective means comprises a reflective element selected from the group consisting of dielectric reflectors and reflective electrodes.

14. The device of claim 13 wherein said electric field control means further includes an electron beam addressing mechanism.

15. The device of claim 12 wherein said reflective means comprises a dielectric reflector affixed to said substrate, said control means further includes a plurality of first electrodes affixed to said substrate, said dielectric reflector overlaps said first electrodes, said first surface of said media means is adjacent and affixed to said dielectric reflector.

16. The device of claim 15 wherein said control means further includes each said first electrode being electrically connected to a respective electronic switching element, each said electronic switching element comprises a thin film transistor, said thin film transistors are affixed to a surface of said substrate which is opposite said dielectric reflector and said media means.

17. A modulator component comprising:

a substrate, a plurality of capacitive elements, each said capacitive element comprising:

a single layer of transmissive electrostatically deformable media, said media further includes a first surface facing said substrate and a second surface opposite thereof, transmissive deformable conductor means affixed to said second surface of said media, reflective means contiguous with said first surface of said media, said second surface of said media is opposite said reflective means, said media of each said capacitive element is integrally associated with said substrate.

18. The device of claim 17 further including an electric field control means to apply electrostatic forces to said conductor means of each said capacitive element, means operatively associated with said control means to vary said electrostatic forces applied to said conductor means of each said capacitive element which varies deformation of said conductor means and said media of said capacitive element thereby phase modulating a wavefront incident on said conductor means traversing said media impinging on and reflected by said reflective means to again traverse said media of the capacitive element and issue from said modulator, said reflective means of each said capacitive element is integrally associated with said substrate, said media of each said capacitive element comprises a material selected from the group consisting of transmissive viscoelastic substances and transmissive elastomers, schlieren means to transform said phase modulated wavefront to a wavefront having identifiable brightness characteristics viewable on a viewing screen.

19. The device of claim 18 wherein said reflective means is stationary.

20. The device of claim 19 wherein said reflective means of each said capacitive element comprises a reflective conductive means adjacent to and in contact with said second surface of said media, said reflective conductive means of each capacitive element is affixed to said substrate.

* * * * *